Aug. 26, 1941.   P. A. VANCE   2,253,962
REACTOR
Filed Aug. 6, 1937

Inventor:
Paul A. Vance,
by Harry E. Dunham
His Attorney.

Patented Aug. 26, 1941

2,253,962

UNITED STATES PATENT OFFICE 2,253,962

REACTOR

Paul A. Vance, Fort Wayne, Ind., assignor to General Electric Company, a corporation of New York Application August 6, 1937, Serial No. 157,758

1 Claim. (Cl. 171—242)

My invention relates to inductance coils or reactors and concerns particularly saturable reactors.

It is an object of my invention to provide an improved saturable reactor having a saturating winding which is free from induction by alternating-current circuits. It is likewise an object to provide a saturable reactor which may be so arranged, when desired, that the alternating-current windings do not tend to neutralize the inductance in each other.

It is also an object of my invention to provide a construction which is virtually self-supporting and which requires a minimum of material, particularly iron and copper, so as to minimize cost and weight. It is a further object of the invention to utilize a construction in which economy is effected by avoidance of scrap or waste material in the process of construction.

It is still another object of my invention to provide a construction in which the reactor core may be operated at high flux density and with relatively low energy loss.

In carrying out my invention in its preferred form, I utilize a pair of strip-wound cores, such as those described in the copending application of John C. Granfield, Serial No. 123,249, filed January 30, 1937, now Pat. 2,160,588, May 30, 1939, and assigned to the same assignee as the present invention, and a winding structure consisting of two alternating-current windings surrounded by a direct-current winding. One of the cores is wound into one of the alternating-current windings and the other core is wound into the other alternating-current winding so that each of the alternating-current windings links one of the cores and the direct-current winding links both cores. The alternating-current windings may be connected either in series or in parallel.

Figure 1:
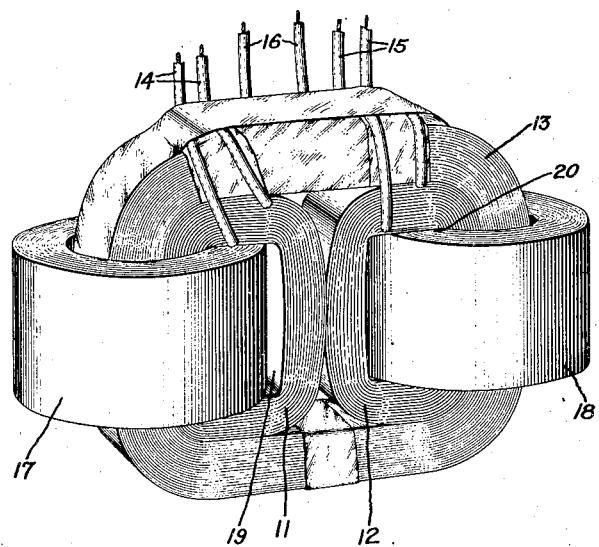
Figure 3:
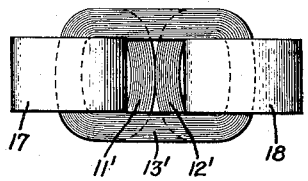
Figure 5:
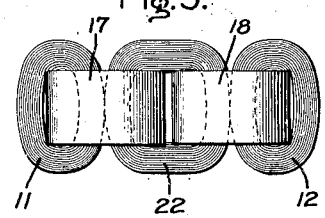
Figure 4:
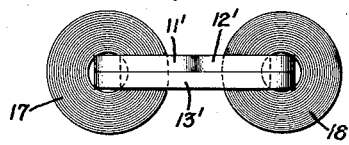
Figure 6:
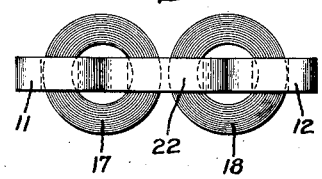
Figure 2:
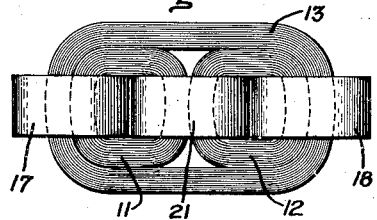

The invention may be understood more readily from the following description when considered in connection with the accompanying drawing and those features of the invention which are believed to be novel and patentable will be pointed out in the claim appended hereto or in the claims of my copending continuation-in-part application, Serial No. 306,916, filed November 30, 1939, and assigned to the same assignee as the present application. In the drawing, Fig. 1 is a perspective view of one embodiment of my invention; Fig. 2 represents a modification of the arrangement of Fig. 1; Fig. 3 is an elevation of another modification of the embodiment of Fig. 1 showing a different arrangement of the windings; Fig. 4 is a plan view of the arrangement of Fig. 3; Fig. 5 is an elevation of still another modification of the embodiment of Fig. 1 with the alternating-current windings transposed to shorten the direct-current winding; and Fig. 6 is a plan view of the arrangement of Fig. 5. Like reference characters are utilized throughout the drawing to represent like parts.

In the arrangement of Fig. 1, the winding structure consists of form-wound alternating-current windings 11 and 12 placed in tangency and surrounded by a form-wound direct-current winding 13. It will be understood that the windings 11, 12, and 13 include suitable insulating material, such as impregnated paper, between layers of turns and covering the inside and outside layers of turns. Pairs of leads 14, 15, and 16 are brought out from the windings 11, 12, and 13, respectively, and may be connected to the desired circuits as in other saturable reactors. The leads 16 are connected to a direct-current circuit and the leads 14 and 15 are connected in series or parallel in an alternating-current circuit.

Strip cores 17 and 18 are wound into the windows 19 and 20 in the windings 11 and 12, and so far as possible within practical limits, the cores completely fill the windows in the windings and the windings completely fill the cores. In this way, maximum utilization of the material present is obtained and, furthermore, no scrap magnetic material results during the process of construction as in the case of cores made up from punched laminations. The cores 17 and 18 are produced in the manner described in the above mentioned copending application Serial No. 123,249, being wound preferably, e. g., from high reduction, cold rolled, three per cent silicon steel strip, which has the most favorable magnetic orientation of the grain of the strip in the direction of rolling, i. e., the length of the strip. Briefly, such cores are produced in the following manner. A strip of core material of the proper length having its most favorable magnetic properties in the direction of its length is tightly wound flatwise upon an arbor or mandrel so that the inside diameter of the spiral coil of strip material is of the exact size it is to be in the finished reactor. The coiled strip is thereupon fastened to prevent the turns from loosening up and is heat-treated as a unit to remove all strains and to set the core to size and shape. After heat treatment the strip is simultaneously unwound from the heat-treated coil and applied to the winding structure by threading successive layers of strip through the window in the coil so that the coil surrounds one side of the current-conducting winding and the outside layer of strip remains on the outside. When all of the strip has been transferred to the winding structure, it is collapsed to its original diameter so that the successive layers of strip occupy the same relative position as during heat-treatment and are strain-free to maintain minimum watt losses.

The coils 11, 12, and 13 are so shaped that their sides or legs surrounded by the strip cores 17 and 18 are substantially straight and the windows 19 and 20 have lengths approximately equal to the width of the magnetic strip, so that the windings can substantially fill the core openings and the cores can substantially fill the windows in the windings.

It will be understood that the reactances of the alternating-current windings 11 and 12 are controlled by adjustment of the current in the direct-current circuit connected to the leads 16 to effect the necessary degree of saturation of the cores 17 and 18. The alternating-current windings 11 and 12 may be connected in either series or parallel but, in either case, are so connected that they tend to produce opposite effects at any instant with respect to magnetic flux threading the direct-current winding 13. In this way, reaction between the alternating and direct-current circuits is eliminated. In order to avoid reaction between the two alternating-current windings and in cases where unbalancing of the alternating-current fluxes with respect to the direct-current winding may be permissible, in order to permit short-circuiting or shunting of one alternating-current winding for varying its reactance separately without effect upon the other alternating-current winding, I ordinarily prefer to retain the approximate arrangement of Fig. 1 in which the magnetic circuit of one alternating-current winding is wholly independent of that of the other since each alternating-current winding has an entirely separate core. However, in cases where it may be desirable, additional alternating flux carrying capacity may be provided without material effect on the area of the direct-current flux path by providing a third magnetic core 21 linking both alternating-current windings as illustrated in Fig. 2.

The arrangement of Fig. 1 has the advantage of being virtually self-supporting since the direct current winding 13 binds the alternating-current windings 11 and 12 together and the strip-wound cores 17 and 18 bind the direct-current winding to the alternating-current windings and are in turn supported by the winding structure.

However, the equivalent electromagnetic effects of the arrangement of Fig. 1 may be obtained by arrangements such as those of Figs. 3 and 4 or Figs. 5 and 6. In the arrangement of Figs. 3 and 4, a direct-current winding 13' is placed beside the alternating-current winding 11' and 12' instead of around the alternating-current windings as in Fig. 1. In order to effect a saving in the weight and $I^2R$ loss in the direct-current winding, the arrangement of Figs. 5 and 6 may be employed, which, it will be observed, uses the same size core for a given copper cross-section as the other arrangements. In the arrangement of Figs. 5 and 6, current-conducting windings and strip-wound cores alternate with each other, each element linking those on either side to form a structure resembling a chain. A shortened direct-current winding 22 is employed which links each of the cores 17 and 18, and the alternating-current windings 11 and 12 linking the cores 17 and 18, respectively, extend outwardly instead of inwardly as in Fig. 1.

I have herein shown and particularly described certain embodiments of my invention and certain methods of operation embraced therein for the purpose of explaining its principle and showing its application, but it will be obvious to those skilled in the art that many modifications and variations are possible and I aim, therefore, to cover all such modifications and variations as fall within the scope of my invention which is defined in the appended claim.

What I claim as new and desire to secure by Letters Patent of the United States, is:

A saturable reactor comprising a pair of form-wound alternating-current windings having core windows therein and placed tangent, a direct-current winding surrounding the other two windings, a magnetic core composed of a strip of magnetic material spirally wound flatwise closely around contiguous sides of said alternating-current windings and partially filling the core windows therein, a magnetic core composed of a strip of magnetic material spirally wound flatwise closely around both one side of said direct-current winding and the remaining side of one of said alternating-current windings and substantially filling the remainder of the core window therein, and a magnetic core composed of a strip of magnetic material spirally wound flatwise closely around both the remaining side of said direct current winding and the remaining side of the other of said alternating current windings and substantially filling the remainder of the core window in said other alternating current winding.

PAUL A. VANCE.